United States Patent [19]

Yamane

[11] 3,860,726

[45] Jan. 14, 1975

[54] PROCESS FOR PRODUCING DIGESTIBLE PUREE FROM THE FRUIT CONTAINING STONE CELLS WITH HIGH VISCOSITY MAINTAINED

[76] Inventor: Akiyoshi Yamane, No. 557-1 Yonebara, Tattori-ken, Japan

[22] Filed: Mar. 27, 1973

[21] Appl. No.: 345,334

[30] Foreign Application Priority Data
Mar. 30, 1972 Japan.............................. 47-31913

[52] U.S. Cl................................... 426/52, 426/481
[51] Int. Cl................................................. A23l 1/06
[58] Field of Search .............................. 426/49–53, 426/372, 373, 428, 479, 489, 495

[56] References Cited
UNITED STATES PATENTS

| | | | |
|---|---|---|---|
| 2,680,688 | 6/1954 | Moultan................................ | 426/51 |
| 3,023,111 | 2/1962 | Huber................................... | 426/50 |
| 3,083,104 | 3/1963 | Celmer.................................. | 426/50 |
| 3,401,040 | 9/1968 | Nury..................................... | 426/51 |
| 3,482,995 | 12/1969 | Hori..................................... | 426/52 |
| 3,615,687 | 10/1971 | Isobe.................................... | 426/52 |

*Primary Examiner*—A. Louis Monacell
*Assistant Examiner*—Martin G. Mullen
*Attorney, Agent, or Firm*—Lane, Aitken, Dunner & Ziems; George A. Loud

[57] ABSTRACT

A process for producing digestible puree from a fruit containing stone cells, which comprises a steps of adding peptidase to the crude puree obtained from a fruit containing stone cells, subjecting the puree to crushing, followed by centrifugal separation. This process features improved separation of the stone cells without causing a decrease in the viscosity of the crude puree. With this process, a puree is obtained which is pleasant to the palate and of a good color tone and suitable for use as the starting material for fruit base drinks.

5 Claims, No Drawings

PROCESS FOR PRODUCING DIGESTIBLE PUREE FROM THE FRUIT CONTAINING STONE CELLS WITH HIGH VISCOSITY MAINTAINED

BACKGROUND OF THE INVENTION

This invention relates to a process for producing a digestible puree from a fruit containing stone cells.

Typical of fruits containing stone cells are Japanese pear, European pear, gllava, etc., which are all of good and unique flavor and taste, and thus suitable as the starting material for fruit base drinks, such as, Nectar. However, unlike other fruits, the pear contains lignocellulose and thus the flesh of the pear is relatively harder. Additionally, the pear contains stone cells which are not digestible and which are unpleasant to the palate when eating. Thus, there exists a need to separate and remove such stone cells in producing fruit base drinks from pears.

The stone cells contain lignin, tannins, cellulose and the like. The presence of stone cells tends to incur the following problems:

a. It tends to reaction with cause a color change to yellow due to the alkali used for peeling fruit.

b. It tends to impair the color tone of the drinks, producing a color change to light black due to iron ions.

c. It produces difficulties in the operation of the exfoliating device and of the homogenizer, because the stone cells are hard grains, around which are tightly entangled pulp-like materials. The exfoliating device is used to separate and remove the pulp-like material and the homogenizer is used to homogenize the crude puree.

Accordingly, in the production of fruit base drinks from starting materials such as pears which contain stone cells, it is mandatory to remove the stone cells to a satisfactory degree and to maintain the viscosity of the crude puree, because the crude puree from pears, particularly from Japanese pears, is lower in viscosity and the amount of the centrifugally flesh pulp is less.

This inventor has earlier disclosed two processes directed to avoiding such difficulties, one process comprising the steps of: crushing the pears and straining the same to obtain crude puree; adding water to the crude puree (in an amount of about twice the crude puree for Japanese pears, and over twice the crude puree for European pears); and subjecting the crude puree thus treated to agitation to separate the stone cells by sedimentation. The second process involves the steps of: treating the crude puree in a super-micronizer (for instance, ULTRAMIZER, Trade Mark, SEIKENSHA, CO., LTD.) and placing the puree thus treated in a bath under moderate agitation to separate the stone cells by sedimentation. However, these two earlier processes still suffer from disadvantages in that: the former has proven not practicable, because the separation of the stone cells is insufficient due to the mere use of water dilution and because there arises a certain limitation for the amount of water to be added in the case of the production of Nectar; and in that the latter has been found to fail in maintaining the viscosity of the crude puree during the treatments by a super-miconizer or a homogenizer, although the separation of the stone cells is satisfactory.

Accordingly, it is an primary object of the invention to provide a process for producing digestible puree from the fruit containing stone cells.

It is a further object of the invention to provide a process of the kind specified which permits the easy separation of the pulp-like matters from the stone cells.

It is a still further object of the invention to provide a process of the kind specified which is capable of maintaining the viscosity of crude puree or otherwise preventing lowering of the viscosity thereof.

SUMMARY OF THE INVENTION

Briefly, the invention invention is a process which involves the steps of: alkali-treatment of the starting fruit which has been selected and washed, peeling, removing the core subjecting the fruit flesh thus treated to crushing and straining to obtain a crude puree. The crushing treatment may be heat-crushing in the presence of an antioxidant to prevent color change and odors followed by straining. To the crude puree thus obtained is added a peptidase, followed by rapid cooling to room temperature where it is allowed to stand for a predetermined period of time. Then, the crude puree thus treated is subjected to an exfoliating treatment to remove from the stone cells the elongated pulp like material which retains fine pieces of fruit flesh. The separating treatment which follows separates the stone cells from the crude puree.

DESCRIPTION OF THE PREFERRED EMBODIMENTS OF THE INVENTION

The enzyme used in the present invention is a peptidase. Illustrative of suitable peptidases are dipeptidase, aminopeptidase, carboxypeptidase, prolinase and, dehydropeptidase. Aminopeptidase is preferred. For purpose of comparison there was used, in the same manner as the peptidase, pectinase, cellulase or protease having similar properties to those of peptidase. The result of the tests are shown in Table 1 below.

TABLE 1

Viscosity versus treatment duration in the separating of the pulp-like material from stone cells Conditions of The Treatment:
1. B-type viscosimeter, rotor No.3, 20 r.p.m. 20°C
2. Peripheral speed (m/m) 1,640
3. Crude puree → enzyme treatment → deactivation treatment (2 hrs 20°C) (90°C 10 min.)

|  | Nomenclature of enzyme | Concentration of enzyme | Viscosity preparatory to separation | Viscosity subsequent to separation | Time required for completion | Remarks |
|---|---|---|---|---|---|---|
| Enzyme | Aminopeptidase | % | 1,600 c.p. | 990 c.p. | 15 min. | Note 1 |
|  | Pectinase |  | 1,685 | 675 | 13 |  |
|  |  | 0.1 |  |  |  |  |
|  | Cellulase |  | 435 | 590 | 1 |  |
|  | Protease |  | 1,635 | 750 | 13 | Note 2 |
| Treatment | Aminopeptidase |  | 1,400 | 1,300 | 8 | Note 1 |
|  | Pectinase |  | 1,550 | 960 | 8 |  |
|  |  | 0.3 |  |  |  |  |
|  | Cellulase |  | 400 | 510 | 0.5 |  |
|  | Protease |  | 1,485 | 1,350 | 8 | Note 2 |
| Non-enzyme treatment |  |  | 1,950 | 700 | 18 |  |

Note 1: Aminopeptidase was used as the peptidase
Note 2: The color tone changed to dark brown It has been found that peptidase has an accelerating effect on excellent the separation of the pulp-like matter from the stone cells and in the prevention of marked changes in the viscosity of the crude puree. In passing, there was no appreciable difference observed in viscosity when protease was used, although the color changed to dark brown. While the viscosity with cellulase increased, the viscosity was too low to be suitable as a starting material for Nectar. As can be seen from Table 1, the peptidase is most effective for intended purpose. The percentage of peptidase should preferably be in the range from 0.05 to 1.0, and the time of for treatment should fall in the range from 1 to 5 hours at room temperature.

Treatment with peptidase enables easy separation of the pulp-like matter from the stone cells. Thus, the decrease in viscosity of the crude puree resulting from the use of exfoliating and separating devices is avoided.

In using exfoliating and separating devices in the present invention, the pressure in the device may be regulated so that the stone cells will not be crushed, and so that the pulp-like matter will be crushed to fine pieces. The pulp-like matter may be easily removed from the stone cells because the pulp-like matter is loosened from the stone cells by the pretreatment with peptidase. As a result, in the process for separating pulp-like matters using a super-micronizer, e.g. a hammer-mill type micronizer, high speed rotation such as of R.P.M.s 5000 to 12,000 at a hammer cycles of 6 to are required, whereas, in the present invention, for the same degree of separation R.P.M.s of only 1,000 to 7,000 at a hammer cycles of 2 to 5 are required. The centrifugal separator is preferred for the intended separation.

The process of the present invention thus enables separating the stone cells while maintaining a high concentration i.e., preventing while an appreciable decrease in the viscosity of the crude puree. Unlike conventional processes, slow agitation of the crude puree is not required for sedimentting the stone cells. Thus separation can be accomplished by the use of a centrifugal separator whose centrifugal force is in the range from 330 to 1,000 G with the amount of liquid processed being 5,500 ltr/hr.

EXAMPLE

Twenty-century pears were immersed in a caustic soda solution of Baume 2° to 5° at a temperature of 80° to 90°C for 5 to 8 minutes and then peeled, followed by washing. The pears thus treated were subjected to crushing and then boiled in hot water at 95° to 98° C for 5 to 7 minutes, followed by straining to thereby obtain crude puree.

To the crude puree thus obtained was added 0.3 % aminopeptidase as the peptidase, and the mixture was rapidly cooled to room temperature (about 20°C), and allowed to stand for 2 hours. It was then heated to deactivate the aminopeptidase. The puree was then force fed to a crusher having four impellers at a rate of 4,000 m/m. The crushed fruit flesh and juice was then fed to a centrifugal separator at a processing rate of 2,500 ltr/hr and at 500 G to separate the stone cells, thus giving a puree product having a high viscosity and suitable for producing nectar. The puree thus obtained was heat-sterilized and filled in a 5 gallon can, sealed and cooled for storage.

As is apparent from the foregoing description, the peptitase accelerates the separation treatment, while the viscosity, which tends to be lowered in the separating and exfoliating treatments, can be maintained effectively. Thus the continuous treatments such as the enzyme addition, exfoliating treatment and separating treatment can be a effected in a relatively short time. While the present invention has been described herein with reference to the above-described embodiments, it should be noted that various changes, modifications, and alterations may be effected without departing from the spirit and the scope of the present invention, as defined in the appended claims.

What is claimed is:

1. A process for producing a digestible puree from a fruit containing stone cells, said process comprising forming a puree, adding peptidase to said puree, and separating said stone cells from said puree.

2. The process of claim 1 wherein the amount of said peptidase is in the range from 0.05 to 1.0 percent by weight.

3. The process of claim 1 wherein the peptidase is allowed to remain in contact with the puree for a time within the range from 1 to 5 hours.

4. The process of claim 1 wherein said separating is by means of centrifugal force within the range of 330 to 1,000G.

5. The process of claim 1 wherein said peptidase is selected from dipeptidase, aminopeptidase, carboxypeptidase, prolinase, and dehydropeptidase.

* * * * *

UNITED STATES PATENT OFFICE
CERTIFICATE OF CORRECTION

Patent No. 3,860,726     Dated January 14, 1975

Inventor(s) AKIYOSHI YAMANE

It is certified that error appears in the above-identified patent and that said Letters Patent are hereby corrected as shown below:

In column 1, line 22, delete "reaction with";

line 39, after "centrifugally" insert --separable--;

In column 3, line 1, after "an" insert --excellent-- line 2, delete "excellent".

line 12, delete "for";

line 29, after "to" (second occurrence) insert --12- ;

line 37, "preventing while" should read -- while preventing --

Signed and sealed this 15th day of April 1975.

(SEAL)
Attest:

RUTH C. MASON
Attesting Officer

C. MARSHALL DANN
Commissioner of Patents
and Trademarks